US011232204B2

(12) United States Patent
Lorch et al.

(10) Patent No.: US 11,232,204 B2
(45) Date of Patent: Jan. 25, 2022

(54) THREAT DETECTION USING ARTIFACT CHANGE ANALYSIS

(71) Applicant: SAP SE, Walldorf (DE)

(72) Inventors: Robert Lorch, Bad Schönborn (DE); Frederik Thormaehlen, Mannheim (DE)

(73) Assignee: SAP SE, Walldorf (DE)

( * ) Notice: Subject to any disclaimer, the term of this patent is extended or adjusted under 35 U.S.C. 154(b) by 143 days.

(21) Appl. No.: 16/196,105

(22) Filed: Nov. 20, 2018

(65) Prior Publication Data

US 2020/0159926 A1 May 21, 2020

(51) Int. Cl.
*G06F 21/56* (2013.01)
*G06F 21/55* (2013.01)

(52) U.S. Cl.
CPC .......... *G06F 21/568* (2013.01); *G06F 21/554* (2013.01); *G06F 21/565* (2013.01)

(58) Field of Classification Search
CPC .... G06F 21/568; G06F 21/554; G06F 21/565; G06F 11/1448; G06F 2201/84; G06F 21/552; H04L 63/1425
See application file for complete search history.

(56) References Cited

U.S. PATENT DOCUMENTS

| 7,934,259 | B1* | 4/2011 | Kennedy | G06F 21/554 726/24 |
| 8,533,818 | B1 | 9/2013 | Ketterhagen et al. | |
| 9,591,010 | B1* | 3/2017 | Muddu | G06N 5/022 |
| 2004/0162781 | A1* | 8/2004 | Searl | H04L 63/1408 705/51 |
| 2016/0065603 | A1 | 3/2016 | Dekel et al. | |
| 2016/0226913 | A1* | 8/2016 | Sood | H04Q 9/00 |
| 2017/0178025 | A1* | 6/2017 | Thomas | G06N 5/025 |
| 2017/0180403 | A1* | 6/2017 | Mehta | H04L 63/1416 |
| 2017/0251002 | A1* | 8/2017 | Rostamabadi | G06F 21/566 |
| 2018/0107824 | A1 | 4/2018 | Gibbons, Jr. et al. | |
| 2018/0109550 | A1* | 4/2018 | Huang | G06F 16/906 |
| 2018/0316708 | A1* | 11/2018 | Strong | G06N 20/00 |
| 2018/0349229 | A1* | 12/2018 | McGralh | G06F 16/958 |
| 2019/0012357 | A1* | 1/2019 | Schreter | G06F 16/215 |
| 2019/0044966 | A1* | 2/2019 | Vega | G06F 21/56 |
| 2019/0130009 | A1* | 5/2019 | McLean | G06F 40/205 |

(Continued)

OTHER PUBLICATIONS

Extended European Search Report, for European Patent Application No. 19207881.4, dated Apr. 6, 2020, 8 pages.

*Primary Examiner* — Joseph P Hirl
*Assistant Examiner* — Thomas A Gyorfi
(74) *Attorney, Agent, or Firm* — Sterne, Kessler, Goldstein & Fox P.L.L.C.

(57) ABSTRACT

Disclosed herein are system, method, and computer program product embodiments for performing threat detection on a monitored system. The monitored system may periodically send artifacts (e.g., database records, binaries, program code, business data) to a repository for storage and creation of a snapshot. This repository is typically held in a cloud-based system. The cloud-based system can compare a snapshot of the artifacts against prior snapshots, and generate a change log. This change log can then be provided to a threat detection system for analysis. By this approach, an intrusion can potentially be detected even when system logs cannot be trusted, due to tampering or other inaccuracies.

18 Claims, 4 Drawing Sheets

(56) References Cited

U.S. PATENT DOCUMENTS

2019/0199744 A1\* 6/2019 Nides ................... H04L 63/1425
2019/0207957 A1\* 7/2019 Espinosa ............. G06F 16/9538
2020/0076835 A1\* 3/2020 Ladnai ................ H04L 63/1416

\* cited by examiner

THREAT DETECTION USING ARTIFACT CHANGE ANALYSIS

BACKGROUND

Effective cybersecurity is an ongoing concern, particularly as the number of attack vectors for computing systems continue to grow. Typical cybersecurity solutions for a computing system often include some component of intrusion prevention and intrusion detection. The corresponding systems, termed intrusion prevention systems (IPS) and intrusion detection systems (IDS), work to minimize or eliminate the impact of a threat.

An IDS will, among other things, look for indications that an unauthorized user or application has successfully accessed the computing system. However, a sophisticated intruder will take steps to mask evidence of their intrusion. Therefore, additional solutions are needed in order to detect intrusions and thereby minimize the impact of a successful attack.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for threat detection using artifact change analysis.

Detecting malicious (or sometimes accidental) activity that damages system integrity is a key component of cybersecurity. While intrusion prevention is a key part of any cybersecurity approach, it is also necessary to detect intrusions in case prevention fails.

Figure 1:
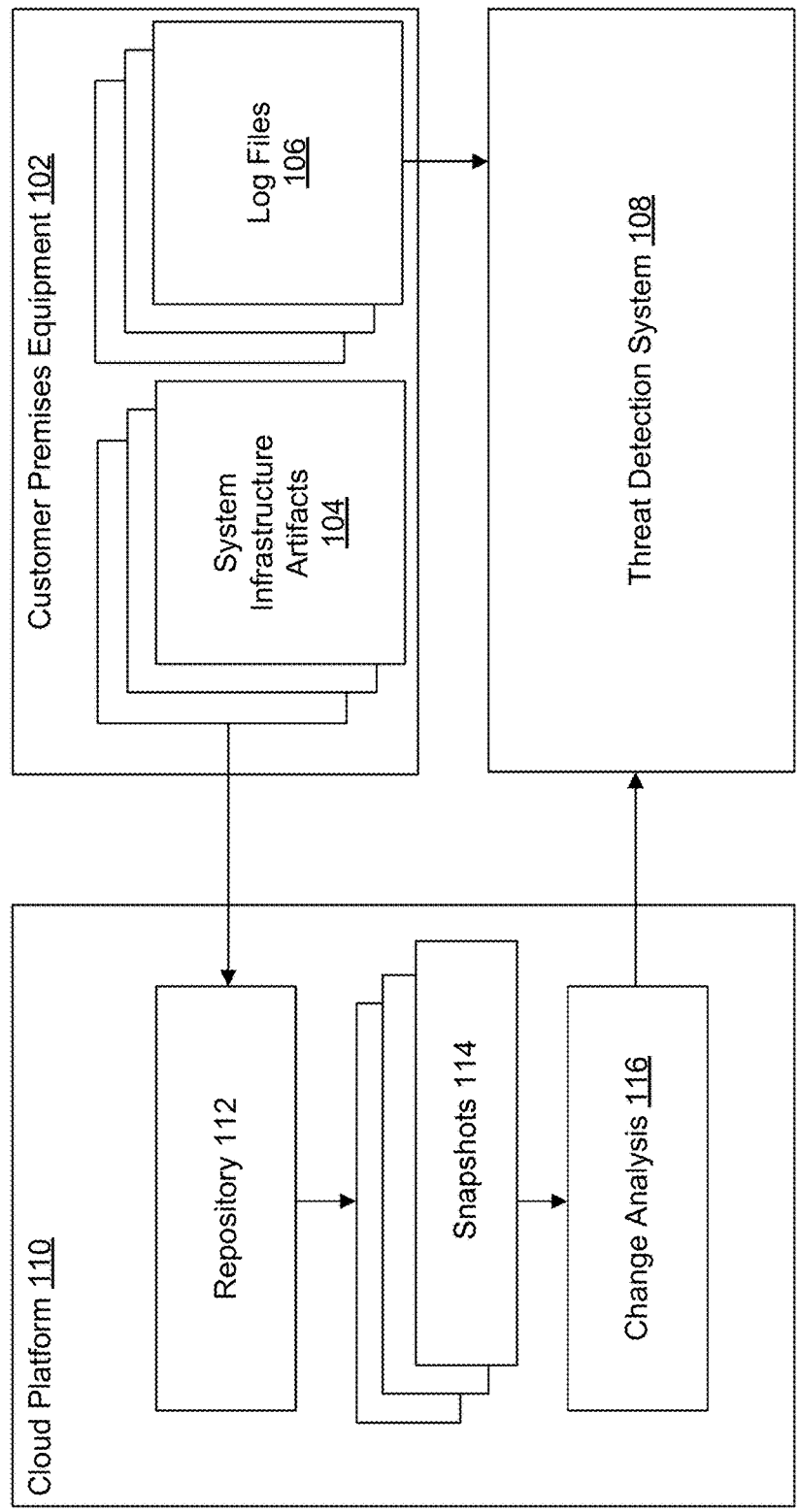
FIG. 1 is a computing environment, in accordance with some embodiments.

FIG. 1 is a computing environment 100, in accordance with some embodiments.

Environment 100 includes customer premises equipment (CPE) 102, which is protected by threat detection system 108, in accordance with an embodiment. CPE 102 generates log files 106. These log files 106 can include information on system events, application logs, and other information reflecting the running environment on CPE 102. These logs can be sent to threat detection system 108 for analysis.

Threat detection system 108 may be a remote system, or it may run within CPE 102. Other possible configurations include cloud-based provision of threat detection system 108, or CPE 102 may itself be cloud-based (e.g., a cloud-based virtual machine). One skilled in the relevant arts will appreciate that any number of arrangements of CPE 102 and threat detection system 108 are contemplated within the scope of this disclosure, and the particular configurations disclosed are provided by way of non-limiting example.

By analyzing the contents of log files 106, threat detection system 108 may be able to identify anomalous behavior. For example, threat detection system 108 may identify modifications to certain records that are rarely or never modified, and alert an administrator of CPE 102 that this anomalous behavior has been detected. Logins by certain users, privilege elevations, timestamps associated with certain events (or a time span between events), and other logged information can be factored into rule-based or intelligent solutions for identifying possible threats.

While analyzing logs remains a key part of threat detection, a number of possible issues make it dangerous to rely solely on log file analysis. Notably, if an attacker is concerned about the detectability of their attacks, the attacker may deliberately try to switch off alarms and logs to hide their activity. Attackers may even tamper with the logs directly. Or attackers may interact with data sources in ways that would not be logged.

Even if the log files 106 have not been tampered with, it is possible that what is being logged is ineffective for detecting tampering. Some applications on CPE 102 may not log at all, or may do so inconsistently or incompletely. And the logs may not provide a picture of what exactly was changed, even if they do indicate that a change was made, making it difficult to zero in on the threat (and perhaps impossible to recover from any damage).

In such an environment, log files 106 cannot be trusted to provide a complete picture that is usable for threat detection. In accordance with an embodiment, CPE 102 is connected to a cloud platform 110 providing a repository 112. This repository can facilitate improved threat detection compared to analysis of just log files 106.

In an embodiment, CPE 102 provides system infrastructure artifacts 104 to the repository 112. System infrastructure artifacts 104 may be any number of possible resources, as will be understood by a person skilled in the relevant arts. By way of a non-limiting example, system infrastructure artifacts 104 may be program code, binaries, user information, authorization data, reports, data entries in a database, or configuration data from CPE 102. System infrastructure artifacts 104 may also include selected business data or metadata, in an embodiment.

System infrastructure artifacts 104 may be exported regularly to repository 112. In accordance with an embodiment, export of system infrastructure artifacts 104 creates snapshots 114 from the information in repository 112. In this configuration, CPE 102 could request a snapshot 114 from cloud platform 110 in order to restore data from the snapshot 114 in the event of a data loss. Repository 112 is, by way of a non-limiting example, a version control system such as Git, although a person skilled in the relevant art will appreciate other approaches to repository 112 storage. In accordance with an embodiment, a full or incremental backup can be used instead of snapshot 114, as a person skilled in the relevant arts would appreciate.

The amount of information exported to repository 112 may be limited by configuration parameters. In one embodiment, the information exported may be limited by configuration to only those system infrastructure artifacts 104 that are significant in detecting a potential threat. For example, information regarding authorized users and their permissions may be exported regularly as this information may not be as large as some datasets generated and/or stored by CPE 102, and yet still provide possible critical evidence of a threat. Alternatively, repository 112 may function as a general snapshot for all or most data on CPE 102, but an administrator may be permitted to specify what information in repository 112 is used to create snapshots 114 for threat detection purposes. By way of a non-limiting example, a configuration engine (not shown) on cloud platform 110 may be configured to specify what data is included in a snapshot, the frequency of such snapshots, and other parameters relevant to the export and snapshot processes.

A change analysis module 116 is configured to compare snapshots 114 to identify changes among them. This comparison generates, in an embodiment, change logs that can be sent by the change analysis module 116 to threat detection system. These change logs reflect changes to the system infrastructure artifacts 104 that have been included in snapshots 114.

As discussed above, CPE 102 and threat detection system 108 may be deployed in a variety of non-limiting configurations, including cloud-based and local configurations. Likewise, cloud platform 110 may be deployed as a central resource available to multiple tenants, deployed as a central system managed within a same enterprise as CPE 102 and threat detection system 108, or in other configurations. In the event that cloud platform 110, CPE 102, and threat detection system 108 need to communicate over unsecured channels (such as the Internet), additional security measures may be taken to secure communications (e.g., communications over HTTPS).

In some embodiments, a firewall may be deployed between CPE 102 and cloud platform 110 (and possibly threat detection system 108). In such a configuration, CPE 102 may need to establish the initial communication to cloud platform 110 and/or threat detection system 108 in order to circumvent the firewall protections. One skilled in the relevant arts will appreciate that other network configurations may be applicable, and are contemplated and within the scope of this disclosure.

With the arrangement shown in FIG. 1, CPE 102 may benefit from the improved threat detection provided by threat detection 108 without any need to change any code or otherwise reconfigure the operation of CPE 102. And because the information used for threat detection by threat detection system 108 is captured and analyzed by cloud platform 110, threat detection can be performed on CPE 102 even after a security incident has occurred.

Examples of the kinds of information that can be detected by threat detection system 108 when reviewing change logs from change analysis module 116 include:

- User xyz received an additional authorization/privilege somewhere between 4 pm and 5 pm on May 15, 2018
- Report SALARY_X was modified between 3 pm and 8 pm on Jun. 15, 2018
- Function module XYZ was changed between 3 pm and 8 pm on Jun. 15, 2018
- Bank account information on business partner xyz was modified between 3 pm and 8 pm on Jun. 15, 2018

Each of these non-limiting examples can be derived from snapshots of system infrastructure artifacts 104. For example, to allow the ability to identify that privileges were elevated for user xyz, CPE 102 may store its privilege tables to repository 112 every hour. These snapshots of the privilege tables can then be stored in snapshots 114 and monitored for changes at change analysis module 116. Threat detection system 108 may then analyze these changes to identify that the change is a potential threat.

Threat detection system 108 may also combine its knowledge of log files 106 and change logs from change analysis module 116 in performing its assessments. For example, if a change is identified by change analysis module 116, but there is no corresponding entry in log files 106 (where one would be expected), this discrepancy may be indicative of tampering of log files 106 by an attacker.

Figure 2:
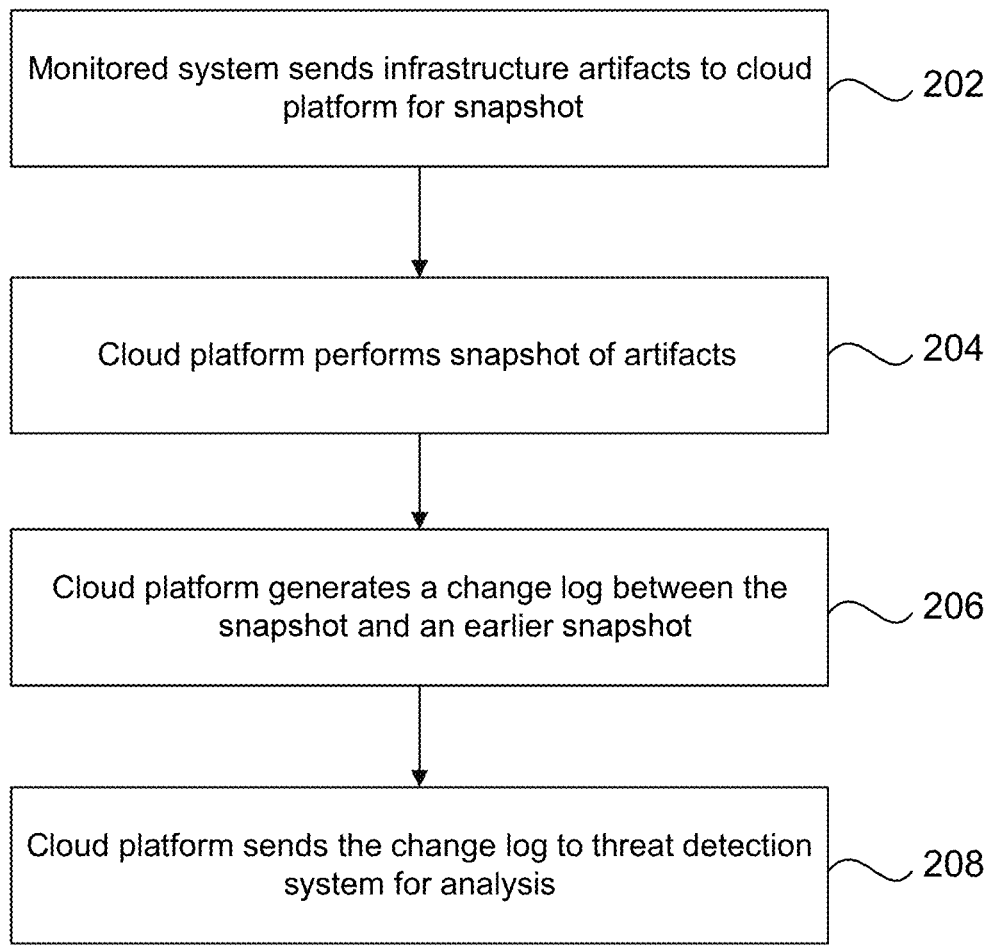
FIG. 2 is a flowchart illustrating steps by which threat detection may be performed, in accordance with some embodiments

FIG. 2 is a flowchart 200 illustrating steps by which threat detection may be performed, in accordance with embodiments. At step 202, a system being monitored for threats, such as CPE 102, sends system infrastructure artifacts 104 to a cloud platform 110 for storage and inclusion in a snapshot. In an embodiment, storage takes place in a repository 112. At step 204, the cloud platform 110 obtains a snapshot of artifacts, such as in snapshots 114.

In an embodiment, the process described thus far can be implemented by a repository 112 used for snapshot purposes. In the event CPE 102 fails, snapshots, such as snapshots 114, may be restored to CPE 102 or a substitute system, allowing applications executing on CPE 102 to continue operating.

However, at step 206, cloud platform 110 compares snapshots 114 in order to determine any changes. And at step 208, these changes are sent to a threat detection system, such as threat detection system 108, for analysis.

Threat detection system 108 may look at the change logs in a variety of different ways, as would be understood by a person skilled in the relevant art. For example, threat detection system 108 may use rules to determine whether a particular change in the change logs is cause for alarm, and notify a particular party that such a change has taken place. This analysis may also identify inadvertent changes to the system, and allow for recovery from such mistakes.

Figure 3:
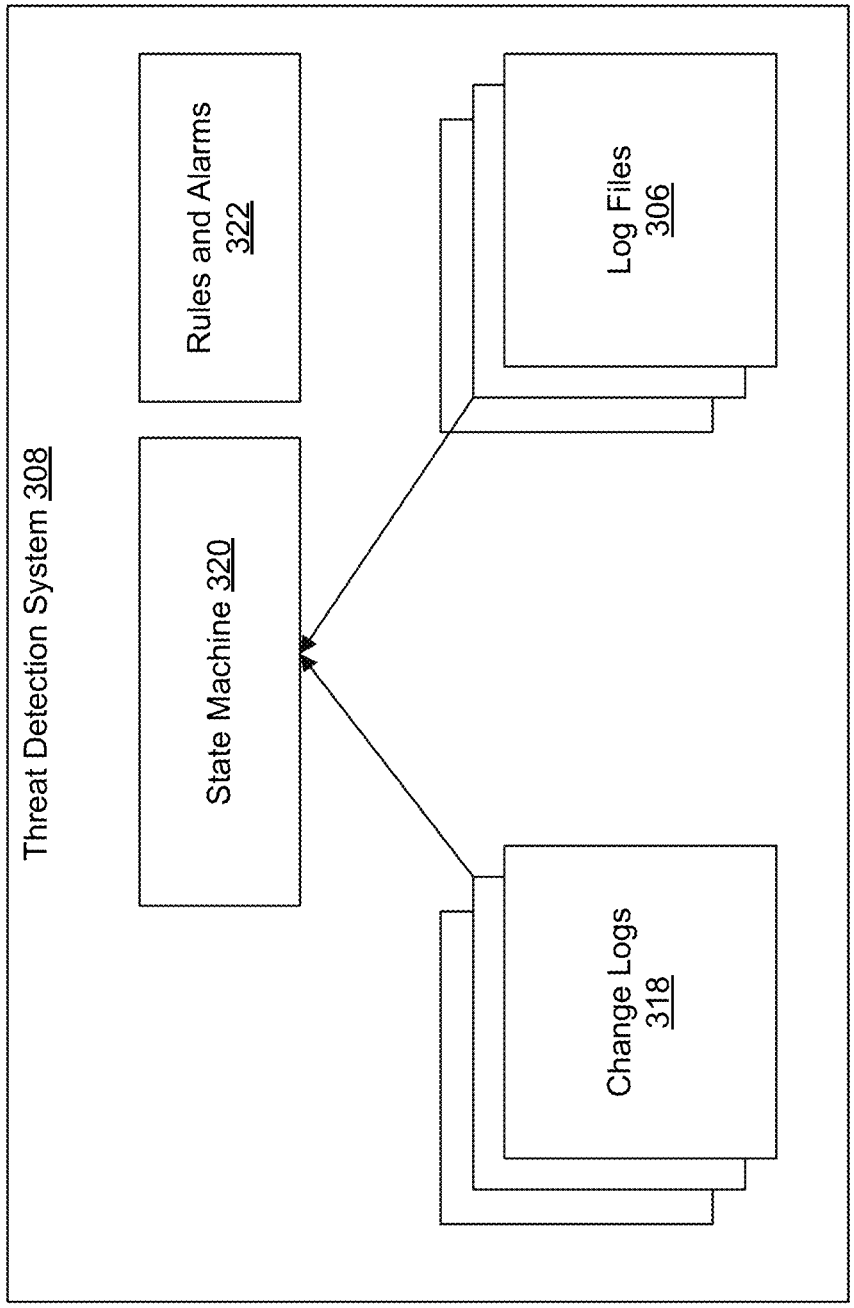
FIG. 3 is an exemplary implementation of a threat detection system, in accordance with some embodiments.

FIG. 3 is an exemplary implementation of a threat detection system 308, in accordance with some embodiments. As shown in FIG. 3, exemplary threat detection system 308 has access to the aforementioned log files 306 and change logs 318. A rules and alarms module 322 can identify particular changes in either log files 306 or change logs 318 and issue an alarm if a particular condition is satisfied.

Threat detection system 308 may also include a state machine 320, in accordance with an embodiment. State machine 320 may allow for identification of certain sequences of events, perhaps spanning multiple entries in log files 306 or change logs 318 (or both), that are cause for alarm. In an embodiment, rules and alarms module 322 receives feedback regarding state changes from state machine 320, and uses these state changes to determine whether an alarm condition is met.

Figure 4:
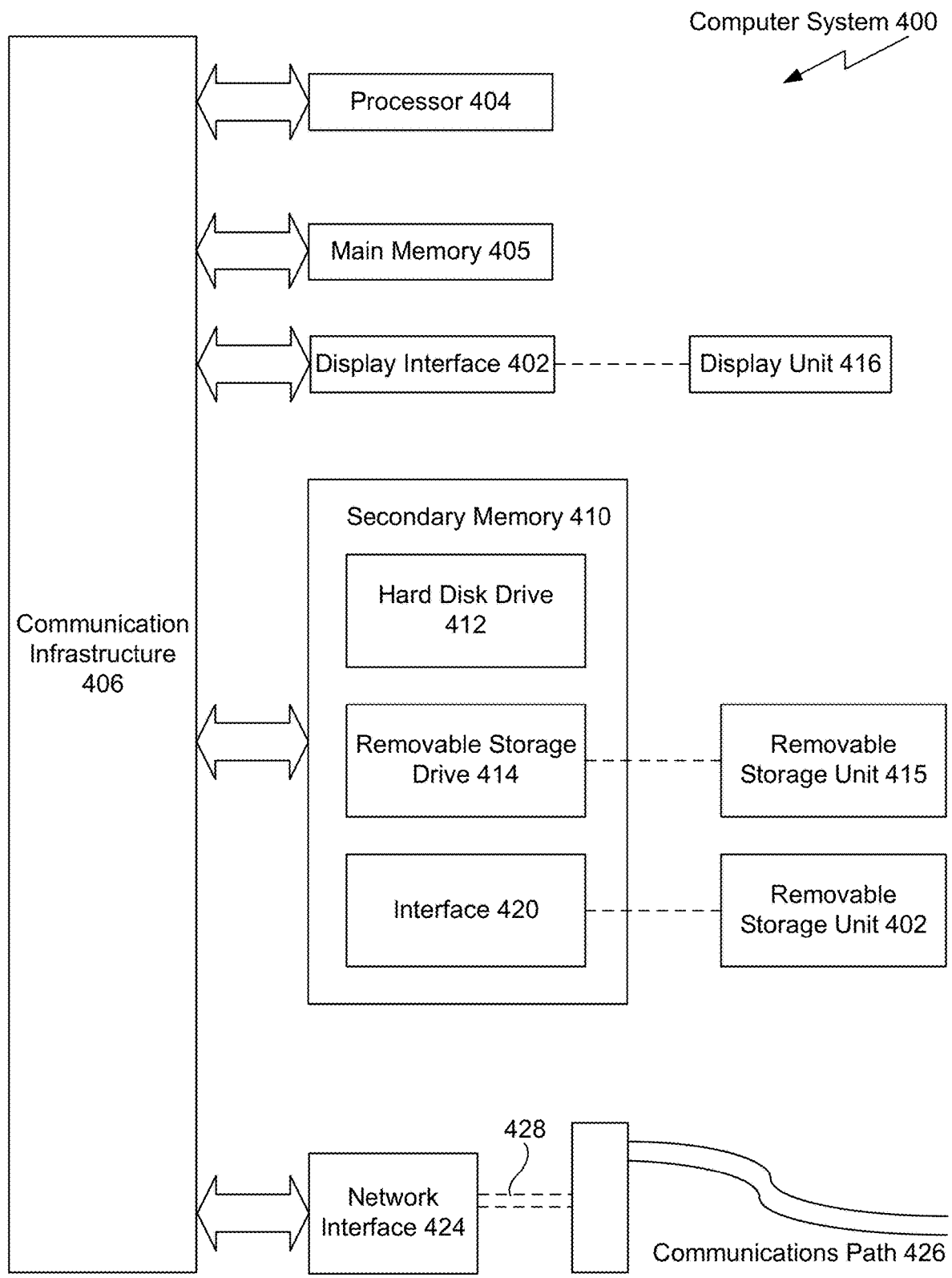
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
storing, by a cloud-based system, an artifact in a repository of the cloud-based system remote from a system monitored for a threat, wherein the artifact is received by the cloud-based system from the system monitored for the threat;
generating, by the cloud-based system, a change log responsive to receipt of the artifact by comparing a snapshot of the artifact to an earlier snapshot of the artifact previously created by the cloud-based system;
determining that the cloud-based system has access to one or more log files including changes to data that occurred on the system monitored for the threat;
identifying a change based on the change log generated by the cloud-based system;
comparing the identified change of the change log to one or more entries in the one or more log files;
determining that there is no entry in the one or more log files corresponding to the identified change;
detecting a threat based on the determination that there is no corresponding entry in the one or more log files for the identified change; and
issuing an alarm based on the detection of the threat that there is no corresponding entry in the one or more log files for the identified change of the change log.

2. The method of claim 1, further comprising:
configuring, by the cloud-based system, selection of the artifact from a plurality of artifacts at the system monitored for the threat.

3. The method of claim 1, wherein the threat detection system is configured to analyze the change log in accordance with a state machine.

4. The method of claim 1, wherein the artifact comprises a set of data entries in a database, and wherein generating the change log comprises:
identifying, by the cloud-based system, a change in the set of data entries between the snapshot and the earlier snapshot;
identifying, by the cloud-based system, a time span between the snapshot and the earlier snapshot; and
recording, by the cloud-based system, the change and the time span to the change log.

5. The method of claim 1, further comprising:
restoring, by the cloud-based system, the snapshot to the system monitored for the threat.

6. The method of claim 1, wherein the system monitored for the threat and the threat detection system are disposed on a same customer premises equipment.

7. The method of claim 6, wherein the artifact comprises a snapshot of user privileges.

8. A cloud-based system, comprising:
a repository;
a memory; and
at least one processor coupled to the memory and configured to perform operations comprising:
storing an artifact in the repository remote from a system monitored for a threat, wherein the artifact is received from the system monitored for the threat;
generating a change log responsive to receipt of the artifact by comparing a snapshot of the artifact to an earlier snapshot of the artifact previously created by the cloud-based system;
determining that the cloud-based system has access to one or more log files including changes to data that occurred on the system monitored for the threat;
identifying a change based on the change log generated by the cloud-based system;
comparing the identified change of the change log to one or more entries in the one or more log files;
determining that there is no entry in the one or more log files corresponding to the identified change;
detecting a threat based on the determination that there is no corresponding entry in the one or more log files for the identified change; and
issuing an alarm based on the detection of the threat that there is no corresponding entry in the one or more log files for the identified change of the change log.

9. The cloud-based system of claim 8, the operations further comprising:
configuring selection of the artifact from a plurality of artifacts at the system monitored for the threat.

10. The cloud-based system of claim 8, wherein the threat detection system is configured to analyze the change log in accordance with a state machine.

11. The cloud-based system of claim 8, wherein the artifact comprises a set of data entries in a database, and wherein to generate the change log, the operations further comprising:
identifying a change in the set of data entries between the snapshot and the earlier snapshot;
identifying a time span between the snapshot and the earlier snapshot; and
recording the change and the time span to the change log.

12. The cloud-based system of claim 8, the operations further comprising:
restoring the snapshot to the system monitored for the threat.

13. The cloud-based system of claim 8, wherein the system monitored for the threat and the threat detection system are disposed on a same customer premises equipment.

14. A non-transitory computer-readable device having instructions stored thereon that, when executed by at least one computing device, cause the at least one computing device to perform operations comprising:
storing, by a cloud-based system, an artifact in a repository of the cloud-based system remote from a system monitored for a threat, wherein the artifact is received from the system monitored for the threat;
generating, by the cloud-based system, a change log responsive to receipt of the artifact by comparing a snapshot of the artifact to an earlier snapshot of the artifact previously created by the cloud-based system;

determining that the cloud-based system has access to one or more log files including changes to data that occurred on the system monitored for the threat;

identifying a change based on the change log generated by the cloud-based system;

comparing the identified change of the change log to one or more entries in the one or more log files;

determining that there is no entry in the one or more log files corresponding to the identified change;

detecting a threat based on the determination that there is no corresponding entry in the one or more log files for the identified change; and issuing an alarm based on the detection of the threat that there is no corresponding entry in the one or more log files for the identified change of the change log.

15. The non-transitory computer-readable device of claim 14, the operations further comprising:

configuring, by the cloud based system, selection of the artifact from a plurality of artifacts at the system monitored for the threat.

16. The non-transitory computer-readable device of claim 14, wherein the threat detection system is configured to analyze the change log in accordance with a state machine.

17. The non-transitory computer-readable device of claim 14, wherein the artifact comprises a set of data entries in a database, and wherein generating the change log comprises:

identifying, by the cloud based system, a change in the set of data entries between the snapshot and the earlier snapshot;

identifying, by the cloud based system, a time span between the snapshot and the earlier snapshot; and recording, by the cloud based system, the change and the time span to the change log.

18. The non-transitory computer-readable device of claim 14, the operations further comprising:

restoring, by the cloud based system, the snapshot to the system monitored for the threat.

\* \* \* \* \*